United States Patent [19]

Geywitz et al.

[11] Patent Number: 5,098,727
[45] Date of Patent: Mar. 24, 1992

[54] PROCESS FOR PREPARING PREGELATINIZED STARCH PRODUCTS

[75] Inventors: Peter Geywitz, Wiblingen, Fed. Rep. of Germany; Richard W. Yoell, Bromham, England

[73] Assignee: Van den Bergh Foods Co., Division of Conopco, Inc., Lisle, Ill.

[21] Appl. No.: 590,550

[22] Filed: Sep. 25, 1990

Related U.S. Application Data

[63] Continuation of Ser. No. 231,111, Aug. 11, 1988, abandoned.

[30] Foreign Application Priority Data

Aug. 12, 1987 [GB] United Kingdom ............... 8719090

[51] Int. Cl.$^5$ .............................................. A23L 1/00
[52] U.S. Cl. .................... 426/448; 426/473; 426/516
[58] Field of Search ............... 426/661, 448, 443, 465, 426/468, 470, 473, 516

[56] References Cited

U.S. PATENT DOCUMENTS

| | | | |
|---|---|---|---|
| 3,137,592 | 6/1964 | Protzman et al. | 127/71 |
| 3,891,624 | 6/1975 | Boonstra et al. | 127/71 |
| 4,031,267 | 6/1977 | Berry et al. | 426/658 |
| 4,567,055 | 1/1986 | Moore | 426/578 |
| 4,568,550 | 2/1986 | Fulger et al. | 426/498 |

FOREIGN PATENT DOCUMENTS

| | | |
|---|---|---|
| 0039957 | 11/1981 | European Pat. Off. |
| 5076247 | 6/1975 | Japan |
| 8301729 | 5/1983 | PCT Int'l Appl. |
| 1008042 | 10/1965 | United Kingdom |
| 8302955 | 9/1983 | World Int. Prop. O. |

OTHER PUBLICATIONS

McGraw-Hill Dictionary of Scientific and Technical Terms (1984), p. A5.
Starch/Starke, vol. 39, No. 10 pp. 352-357.
Patent Abstracts of Japan, vol. 11, No. 136; JP 61-271963.
Abstract of JP 51051555 5-7-76.
Abstract of JP 78019671 6-22-78.

*Primary Examiner*—George Yeung
*Attorney, Agent, or Firm*—Rimma Mitelman

[57] ABSTRACT

A highly adsorbent edible pregelatinized starch product is prepared by extruding a starch composition in the presence of a minor amount of water at temperatures of at least 150° C. enabling gas-forming additives to be dispensed with. The products have low bulk density and are highly adsorbent, enabling mixtures with liquid products such as lipids to be obtained in powdered form.

2 Claims, No Drawings

PROCESS FOR PREPARING PREGELATINIZED STARCH PRODUCTS

This is a continuation application of Ser. No. 231,111, filed Aug. 11, 1988, now abandoned.

This invention relates to the preparation of fat adsorbent starch and in particular to a method for preparing such starch by extrusion.

Adsorbent starch is a widely-used ingredient for food compositions and may be prepared from farinaceous materials such as potato starch, rice starch or wheat or other cereal flour, by heat-drying an aqueous slurry of the material on a heated drum from which it is scraped off by a doctor blade, the starch in the feedstock being pregelatinised in the process and the product providing a highly adsorbent, edible carrier for fat or other liquefiable food component.

It is known from Japanese patent J.51051555, to extrude boiled and crushed waxy milo granules at 120°–200° C. for use in cake recipes. It is also known from Japanese patent specification number 78019-671, to prepare an additive for processed meat by extruding corn starch with 20 to 40% water and up to 20 parts by weight of sucrose fatty acid ester. In DE320675 a process is described for the preparation of expanded pregelatinised starch products by extrusion of comminuted or granulated starch or starch-containing material which may be modified by treatment with cross-linking agents. The extrusion is carried out in the presence of 10 to 30% water and a gas-forming agent comprising a metal carbonate with a suitable acid for generating carbon dioxide during the extrusion. The extrusion is conducted in a screw press under elevated pressure and at a temperature of 140° C. and the extrudate is milled.

We have now found an improved process by conducting the extrusion at a temperature of at least 150° C., preferably 175° to 200° C. which surprisingly yields product having a very low bulk density and may be carried out in the absence of gas-forming additives, in particular additives leaving residual metal derivatives in the product.

The present invention provides a method for obtaining highly adsorbent, edible powdered carrier material which comprises extruding a mixture of farinaceous vegetable starch with a small amount of water and at a temperature of at least 150° C. sufficient to gelatinise starch present in the material and crushing the extruded matter, preferably to an average particle size from 100 to 500 microns.

Preferably, the feedstock comprises vegetable starch extracted from seed crops. Cassava and potato starch are also suitable.

The composition to be extruded preferably contains less than 10% added water, particularly from 1 to 5% added water. Preferably also the aqueous mixture is aerated during extrusion, for example by incorporating an aerating agent eg. ammonium bicarbonate or baking powder in the mixture being extruded. The amount of any aerating agent present is preferably from 0.1 to 1% by weight of the extrusion mixture. Where a gassing agent is adopted preferably ammonium carbonate is used.

Extrusion is effected at a temperature of at least 150° C. preferably 150° to 200° C., at which the starch content of the extrusion mix is gelatinised. The extrusion is preferably effected at a pressure from 10 bar to 100 bar, particularly 20 to 50 bar. Proprietary equipment suitable for the process of the invention consists of a generally cylindrical casing enclosing a pair of parallel, co-rotatable feedscrews along the length of which the starch is delivered from a hopper at the back of the device, forward to an extrusion plate at the front, the plate being for example, 5 cms. in diameter and furnished with extrusion holes 0.5 cms. in diameter. Suitable equipment is manufactured by Werner-Pfeidlerer.

Pregelatinised starch powder finds a variety of applications in the food industry, particularly as an ingredient which readily adsorbs moisture in cake batters and dough and thereby contributes to maintain a highly viscous composition in recipes. It is also particularly suitable as a carrier on which fat can be adsorbed thereby providing a fat in a powdered form which can be readily poured and measured in industrial and also domestic applications, particularly in cake and batter mixes requiring the addition only of water, eggs or milk and containing flour, dried eggs, sugar and other cake or pancake ingredients. The starch products of the present invention exhibit very high surface area and low bulk density characteristics, particularly 20–100 gms/liter.

The present invention therefore also provides a mixture of pregelatinised starch having a bulk density of 20–100 gms/liter on which is preferably absorbed an edible fat composition in an amount from 20 to 80% preferably 50–75% by weight of the starch. In such compositions, the fat may comprise liquid or solid food quality oils or fats, or other edible food lipids eg. emulsifiers as generally used in the food industry including animal, vegetable, and margarine oils eg. soya bean oil, palm oil, coconut and other lauric fats, sunflower oil and also hard butters eg. sal, shea, cokum and coco butter and their fractionated and hydrogenated products. These admixtures are advantageous in that with the addition of water the adsorbed fat is immediately available in the resulting dough or butter. In contrast, compositions containing spray dried fats commonly used in similar formulations, provide less accessible fat upon immediate addition of water since the fat is encapsulated in the spray-drying process.

Other ingredients may be incorporated in the mix to be extruded, particularly nuts or fruit, especially in dried form, to provide culinary variations in cooking compositions.

Applications of extruded starch made in accordance with the process of the present invention include use as a fat carrier in culinary mixes eg. cake and custard mixes, for emulsifiers eg. DATA esters and partial glycerides to prevent caking and to improve the free-flowing properties of these materials and mixtures containing them, and as carriers for non-water-based liquid flavours to provide these in a powdery structure. The extruded products of the invention may also be used as a carrier for fat-encapsulated components, to provide controlled release of active components for example ascorbic acid, for use in bread mixes and bread improvers.

EXAMPLE

Twin-screw co-rotating extruders ex. Werner and Pfleiderer fitted with extusion dies 4 mm bore and heaters were supplied with starch and water under conditions given in the accompanying table in a series of tests and the properties of the extrudate were measured in each and appear in the Table.

Test 1 was carried out using 0.5 wt% ammonium bicarbonate.

In a comparison with a commercially available variety of potato starch extruded with ammonium carbonate, the products of the above tests exhibited lower moisture content and greater fat uptake, while the rice starch showed a higher amount of particles greater than 500 microns when milled.

of a gas-forming agent under a pressure of from 10 bar to 50 bar at elevated temperatures sufficient to gelatinise the starch in the presence of less than 10% added water, wherein the temperature of the material during extrusion is maintained at a temperature in a range of from 175° C. to 200° C., and crushing the extruded product to produce a starch product having a bulk density of from 20–100 grams/liter.

TABLE

| | | FEED | | | EXTRUSION | | SCREW | EXTRUDATE | | | |
|---|---|---|---|---|---|---|---|---|---|---|---|
| | | STARCH | | WATER | | | | BULK DENSITY g/LITER | | FAT UPTAKE STARCH: | |
| TEST | TYPE | MOIST. WT % | RATE KG/HR | RATE KG/HR | TEMP. °C. | PRESS BAR | SPEED RPM | EXTRUDED | MILLED TO 0.2-1 mm | FAT WT. RATIO | MOIST. WT % |
| 1 | WHEAT* | 12 | 350 | 40 | 200 | 17 | 250 | 25 | 70 | 1:4 | 8.2 |
| 2 | WAXY MAIZE | 14 | 18.6 | 1.4 | 170 | 18 | 200 | 60 | 120 | 1:2.5 | 8.6 |
| 3 | RICE | 14.4 | 19.4 | 1.8 | 176 | 17 | 200 | 40 | 90 | 1:3.5 | 7.8 |
| 4 | CORN | 13.3 | 18.7 | 2.6 | 180 | 19 | 180 | 30 | 72 | 1:4 | 8.1 |

*WITH 0.5% NH$_4$HCO$_3$

We claim:
1. Process for the preparation of a highly adsorbent carrier material comprising extruding a farinaceous vegetable starch-containing composition in the absence of a gas-forming agent under a pressure of from 10 bar to 50 bar at elevated temperatures sufficient to gelatinise the starch in the presence of less than 10% added water, wherein the temperature of the material during extrusion is maintained at a temperature in a range of from 175° C. to 200° C., and crushing the extruded product to produce a starch product having a bulk density of from 20–100 grams/liter.

2. The process according to claim 1, wherein the pressure is from 20 bar to 50 bar.

* * * * *